United States Patent
Chernyshov et al.

(10) Patent No.: US 8,609,263 B1
(45) Date of Patent: Dec. 17, 2013

(54) SYSTEMS AND METHODS FOR FORMING MAGNETIC MEDIA WITH AN UNDERLAYER

(75) Inventors: Alexander Chernyshov, San Jose, CA (US); Hua Yuan, Milpitas, CA (US); B. Ramamurthy Acharya, Fremont, CA (US); Antony Ajan, Santa Clara, CA (US)

(73) Assignee: WD Media, LLC, San Jose, CA (US)

( * ) Notice: Subject to any disclaimer, the term of this patent is extended or adjusted under 35 U.S.C. 154(b) by 174 days.

(21) Appl. No.: 13/112,959

(22) Filed: May 20, 2011

(51) Int. Cl.
    *G11B 5/66* (2006.01)
(52) U.S. Cl.
    USPC .......................................... 428/831; 427/131
(58) Field of Classification Search
    USPC .................. 428/831, 831.2; 360/135
    See application file for complete search history.

(56) References Cited

U.S. PATENT DOCUMENTS

| | | | |
|---|---|---|---|
| 6,383,667 B1 * | 5/2002 | Futamoto et al. | 428/836.3 |
| 6,548,194 B2 | 4/2003 | Hikosaka et al. | |
| 7,128,987 B2 | 10/2006 | van de Veerdonk et al. | |
| 7,195,827 B2 | 3/2007 | Maeda et al. | |
| 7,407,685 B2 | 8/2008 | Watanbe et al. | |
| 7,494,725 B2 * | 2/2009 | Maeda et al. | 428/831 |
| 7,656,615 B2 | 2/2010 | Wachenschwanz et al. | |
| 8,449,730 B2 * | 5/2013 | Yang et al. | 204/192.1 |
| 2004/0191578 A1 | 9/2004 | Chen et al. | |
| 2008/0096050 A1 | 4/2008 | Kikitsu et al. | |
| 2009/0176128 A1 * | 7/2009 | Yasui et al. | 428/810 |
| 2010/0021768 A1 * | 1/2010 | Sonobe et al. | 428/829 |
| 2010/0251842 A1 * | 10/2010 | Ma | 74/333 |

OTHER PUBLICATIONS

Yu-Nu Hsu, et al. "The Effects of Ag Underlayer and Pt Intermediate Layers on the Microstructure and Magnetic Properties of Epitaxial FePt Thin Films", JMMM 260 (2003) 282-294.

* cited by examiner

*Primary Examiner* — Holly Rickman

(57) ABSTRACT

Systems and methods for forming magnetic media with an underlayer are provided. One such method includes providing a non-magnetic substrate, forming a seed layer above the substrate, the seed layer including MgO, forming an underlayer on the seed layer, the underlayer including a material selected from the group consisting of Pd, Pt, W, Fe, V, Cu, and Ag, and forming a magnetic recording layer on the underlayer, the recording layer including FePt oxide.

35 Claims, 3 Drawing Sheets

SYSTEMS AND METHODS FOR FORMING MAGNETIC MEDIA WITH AN UNDERLAYER

FIELD

The present invention relates to magnetic recording technology, and more specifically to systems and methods for forming magnetic media with an underlayer.

BACKGROUND

In order to increase the magnetic density of magnetic media used for perpendicular magnetic recording (PMR), smaller grain size recording is becoming required. Smaller grain size however demands higher Ku materials (e.g., materials having a high magnetic anisotropy energy constant) for a recording layer to sustain thermal stability. To achieve granular structure and small grain size in high Ku recording media, segregation materials such as carbon are generally added to magnetic film. Adding carbon to the recording media gives an advantage of lower L10 ordering (deposition) temperature. However, such excess of carbon results in a rough porous film, often with observed second column formation (e.g., ghost particles). In addition, the performance of the media is not particularly good. Thus, the physical and performance characteristics of conventional L10 ordered media are often inadequate to meet the needs of the increasing densities required to meet present data storage requirements.

SUMMARY

Aspects of the invention relate to systems and methods for forming magnetic media with an underlayer. In one embodiment, the invention relates to a method for fabricating a magnetic media with improved performance characteristics, the method including providing a non-magnetic substrate, forming a seed layer above the substrate, the seed layer including MgO, forming an underlayer on the seed layer, the underlayer including a material selected from the group consisting of Pd, Pt, W, Fe, V, Cu, and Ag, and forming a magnetic recording layer on the underlayer, the recording layer including FePt oxide.

In another embodiment, the invention relates to a magnetic media structure with improved performance characteristics, the media structure including a non-magnetic substrate, an amorphous interlayer positioned on the non-magnetic substrate, a seed layer positioned on the amorphous interlayer, the seed layer including MgO, an underlayer positioned on the seed layer, the underlayer including a material selected from the group consisting of Pd, Pt, W, Fe, V, Cu, and Ag, and a magnetic recording layer positioned on the underlayer, the recording layer including FePt oxide.

DETAILED DESCRIPTION

Figure 1:
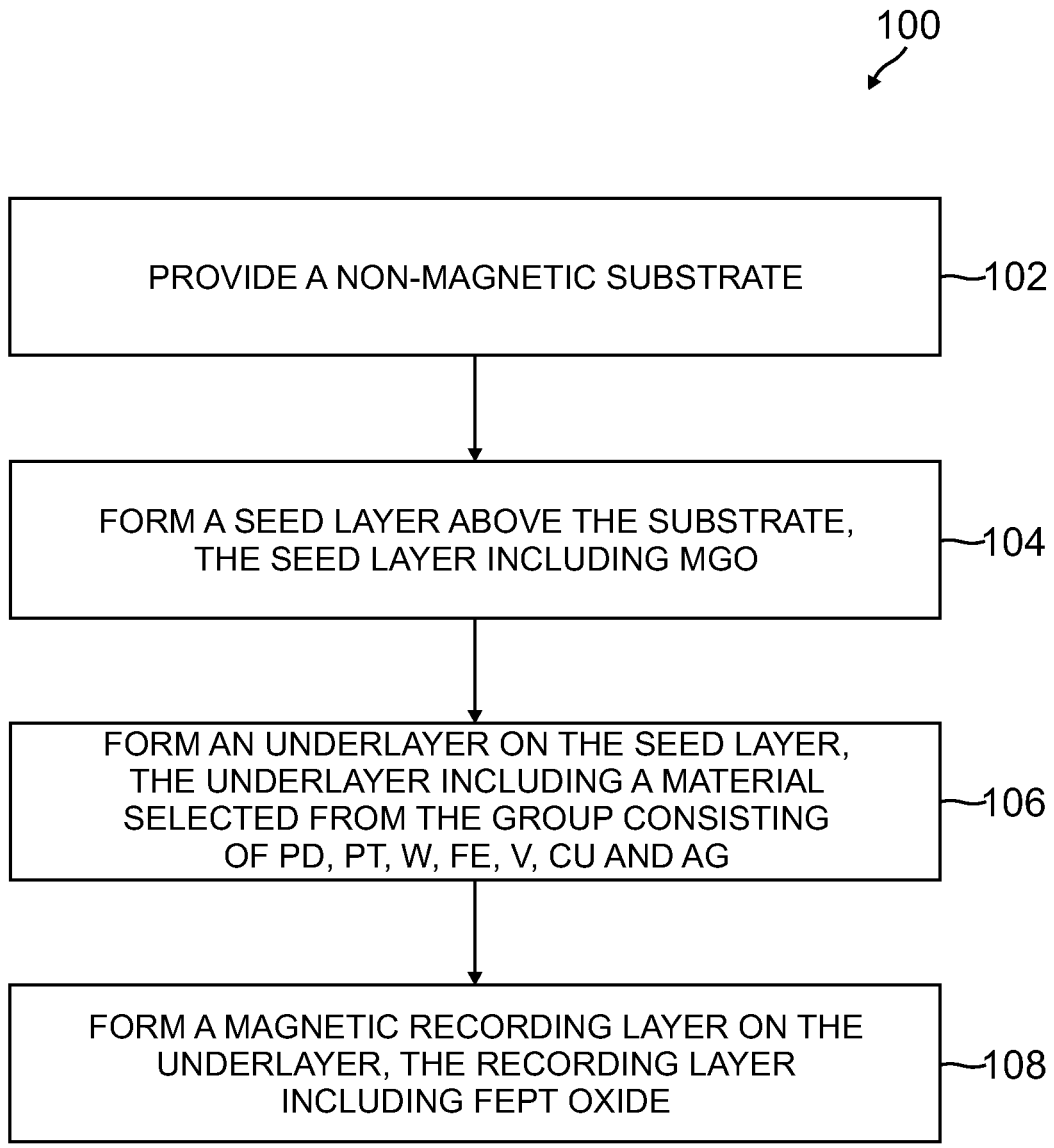
FIG. 1 is a flowchart of a process for manufacturing a magnetic media having an underlayer that provides for improved performance characteristics in accordance with one embodiment of the invention.

Referring now to the drawings, magnetic media structures having underlayers that provide improved performance characteristics and processes for manufacturing those structures are illustrated. The magnetic media structures include an underlayer positioned below the recording layer and on a seed layer for the recording layer. The underlayer can be a material selected from the elements including Pd, Pt, W, Fe, V, Cu, Ag, or other suitable elements. In one embodiment, the underlayer consists of Pd.

Processes for manufacturing the magnetic media structures include providing a non-magnetic substrate, forming a seed layer above the substrate, the seed layer including magnesium oxide (MgO), forming the underlayer on the seed layer, and then forming the magnetic recording layer on the underlayer, where the recording layer includes iron platinum FePt (oxide). In some embodiments, the processes also include forming an amorphous underlayer on the non-magnetic substrate, forming a heat-sink layer on the amorphous underlayer, and forming an amorphous interlayer on the heat-sink layer, where the seed layer is positioned on the amorphous interlayer.

The processes and resulting magnetic media structures can provide improved L10 ordering (e.g., magnetic coercivity) and lowered surface roughness for the media structure.

FIG. 1 is a flowchart of a process 100 for manufacturing a magnetic media having an underlayer that provides for improved performance characteristics in accordance with one embodiment of the invention. The process first provides (102) a non-magnetic substrate. The process then forms (104) a seed layer above the substrate, the seed layer including MgO. The process forms (106) an underlayer on the seed layer, the underlayer including a material selected from the group including Pd, Pt, W, V and/or Fe. In one embodiment, the underlayer consists essentially of Pd. In another embodiment, the underlayer consists of Pd. In one embodiment, the underlayer material includes elements Ag and/or Cu. In other embodiments, other suitable materials can be used for the underlayer. The process then forms (108) a magnetic recording layer on the underlayer, the recording layer including FePt oxide.

In some embodiments, the process also forms an amorphous underlayer on the non-magnetic substrate, a heat-sink layer on the amorphous underlayer, an amorphous interlayer on the heat-sink layer, where the seed layer is positioned on the amorphous interlayer. In one such embodiment, the amorphous underlayer includes CoTaZr and one or more materials selected from the group including CrTa, CoCrFeZrB, and/or CoCrTaZr. In another such embodiment, the heat-sink layer includes one or more materials selected from the group including Cu, CuZr, W, Ru, and/or CuTi. In one embodiment, the amorphous interlayer includes a material selected from the group including amorphous magnetic CoTaZr, non-magnetic CoCrTaZr, and/or non-magnetic CoCrFeZrB.

In several embodiments, the seed layer, the underlayer, the recording layer, the amorphous underlayer, the heat-sink layer, and the amorphous interlayer are formed using one or more sputter deposition processes.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 2:
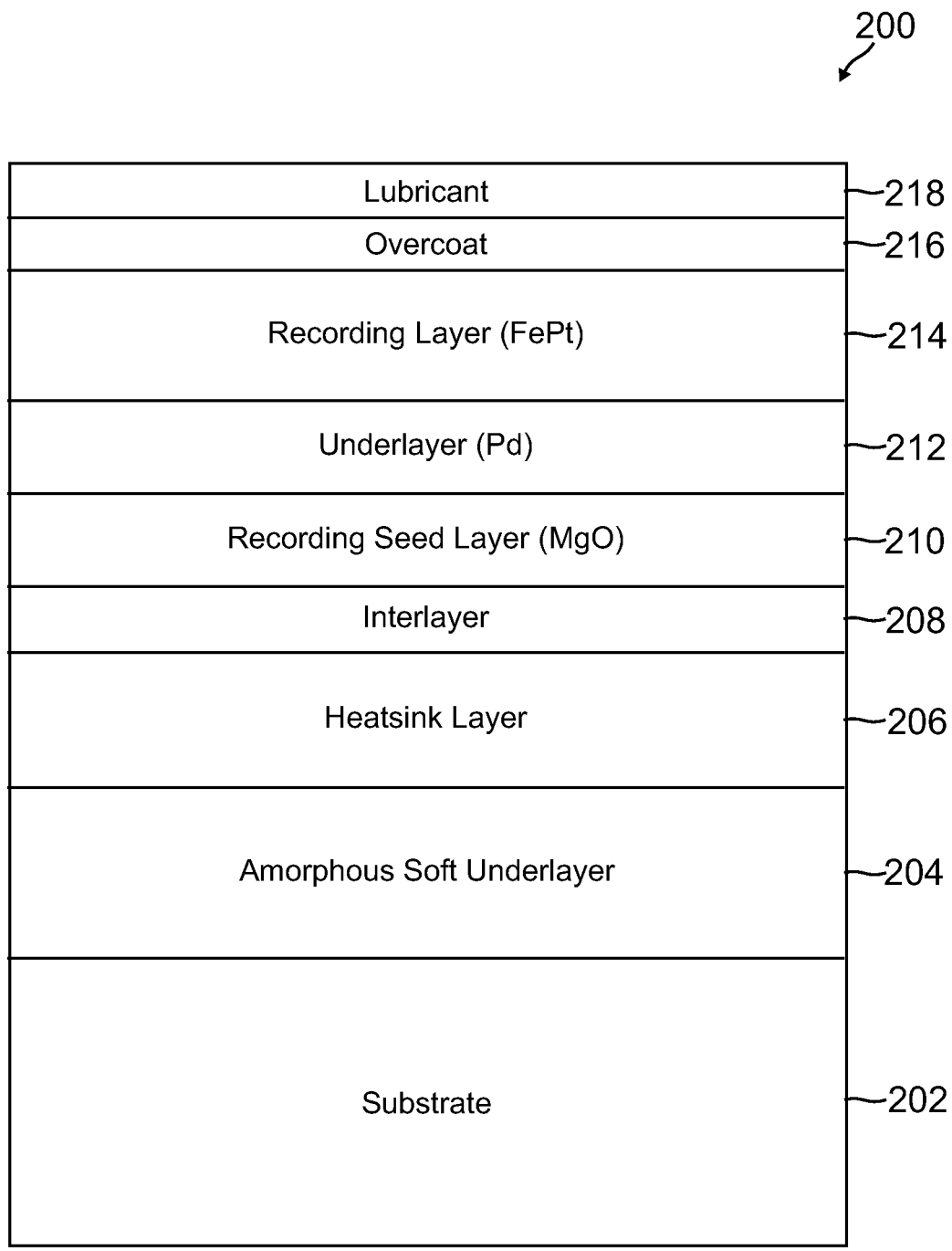
FIG. 2 is a side view of a magnetic media having an underlayer that provides for improved performance characteristics in accordance with one embodiment of the invention.

FIG. 2 is a side view of a magnetic media 200 having an underlayer 212 that provides for improved performance characteristics in accordance with one embodiment of the invention. The media 200 includes, from bottom to top, a non-magnetic substrate 202, an amorphous soft underlayer 204, a heat-sink 206, an amorphous interlayer 208, a seed layer 210 including MgO, the underlayer 212 including a material selected from the group including Pd, Pt, W, V, Ag, Cu, and/or Fe, a magnetic recording layer 214 including FePt oxide, an overcoat layer 216, and a lubricant layer 218. In particular embodiments, the media 200 can be formed using one or more of the processes described above in the discussion of FIG. 1.

In one embodiment, the underlayer 212 consists essentially of Pd. In another embodiment, the underlayer 212 consists of Pd. In other embodiments, other suitable materials can be used for the underlayer. In one embodiment, the amorphous underlayer 204 is formed of CoTaZr and one or more materials selected from the group including CrTa, CoCrFeZrB, and/or CoCrTaZr. In one embodiment, the heat-sink layer 206 includes one or more materials selected from the group including Cu, CuZr, W, Ru, and/or CuTi. In one embodiment, the amorphous interlayer 208 includes one or more materials selected from the group including amorphous magnetic CoTaZr, non-magnetic CoCrTaZr, and/or non-magnetic CoCrFeZrB. In one embodiment, the seed layer 210 includes one or more of TiN and RuAl. In several embodiments, the recording layer 214 includes L10 material (e.g., CoPt) and one or more of the segregant-type materials such as $Cr_2O_3$, $TiO_2$, $SiO_2$, and $Ta_2O_5$. In several embodiments, the non-magnetic substrate 202 is formed of glass, AlMg, and/or other suitable materials. In one embodiment, the overcoat layer 216 includes carbon. In other embodiments, each of the layers can include other suitable materials.

In one embodiment, the amorphous underlayer 204 has a thickness of about 10 nanometers (nm) to about 50 nm, the heat-sink layer 206 has a thickness of about 10 nm to about 100 nm, the amorphous interlayer 208 has a thickness of about 10 nm to about 50 nm, the seed layer 210 has a thickness of about 1 nm to about 10 nm, the underlayer 212 has a thickness of less than 1 nm, and the recording layer 214 has a thickness of about 5 nm to about 15 nm. For each of the ranges referenced herein, the range is intended to include the end points unless otherwise noted.

In one embodiment, the amorphous underlayer 204 has a thickness of about 40 nanometers (nm), the heat-sink layer 206 has a thickness of about 40 nm, the amorphous interlayer 208 has a thickness of about 20 nm, the seed layer 210 has a thickness of about 4 nm, the underlayer 212 has a thickness of less than 1 nm, and the recording layer 214 has a thickness of about 10 nm. In one embodiment, the underlayer 212 has a thickness of about 0.25 nm. In other embodiments, the layers can have other suitable thicknesses.

Figure 3:
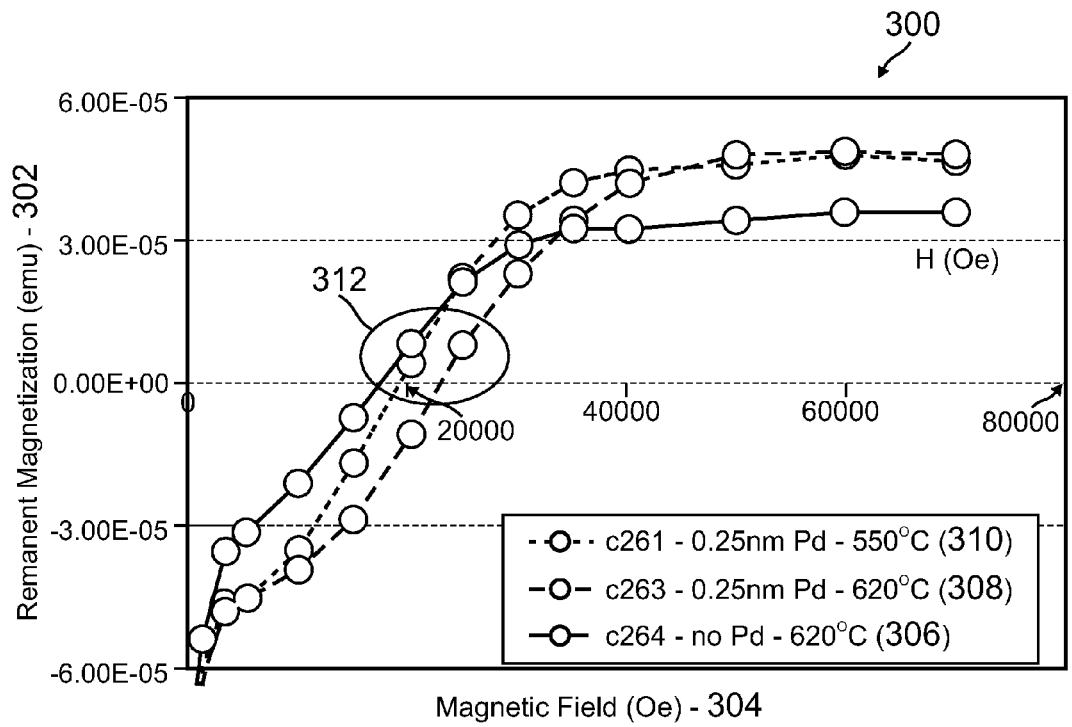
FIG. 3 is a graph of remanent magnetization versus magnetic field for both a FePt oxide magnetic media without an underlayer and a FePt oxide magnetic media with an underlayer in accordance with one embodiment of the invention.

FIG. 3 is a graph 300 of remanent magnetization 302 versus magnetic field 304 for both a FePt oxide magnetic media without an underlayer 306 and a FePt oxide magnetic media with an underlayer deposited at first and second temperatures (308, 310) in accordance with one embodiment of the invention. A first trace 308 represents the magnetic media structure with the underlayer deposited at the first temperature of 620 degrees Celsius. A second trace 310 represents the magnetic media structure with the underlayer deposited at the second temperature of 550 degrees Celsius. A third trace 306 represents the magnetic media without an underlayer.

The remanent coercivity points of interest (Hc) occur when the magnetization is about zero (e.g., see circled area 312). At this zero level, the remanent coercivity for the conventional media 306 is about 18 kOe, while the remanent coercivity for the media with the underlayer deposited at 620 degrees 308 is about 22 kOe. Further, it can be seen that the temperature of the media with the underlayer can be decreased without significant loss in coercivity (e.g., remanent coercivity for the media with the underlayer deposited at 550 degrees 310 remains above about 19 kOe). In several embodiments, the thickness of the underlayer can be optimized to achieve a highest remanent coercivity for a preselected deposition temperature. As can be seen in FIG. 3, the remanent coercivity and minimum deposition temperature are improved over the conventional media. In one embodiment, the data in FIG. 3 corresponds to an underlayer of about 0.25 nm of Pd under a bi-layer recording layer including about 5 nm of $FePt:TiO_2$ and about 5 nm of $FePt:SiO_2$.

Figure 4:
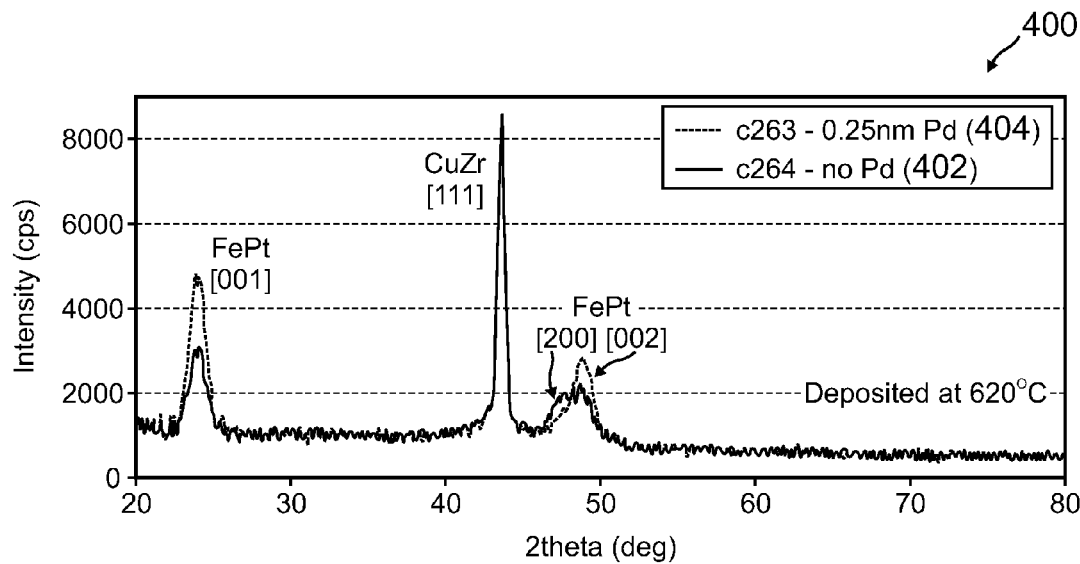
FIG. 4 is a graph of x-ray diffraction scans for both a FePt oxide magnetic media without an underlayer and a FePt oxide magnetic media having an underlayer in accordance with one embodiment of the invention.

FIG. 4 is a graph 400 of x-ray diffraction scans for both a conventional magnetic media without an underlayer 402 and a magnetic media having an underlayer 404 in accordance with one embodiment of the invention. The graph 400 shows that the origin of the Hc improvement of FIG. 3 is related to the observation that [001] FePt peak is significantly higher when Pd is added (404 trace) as well as the observation that the [002] peak is higher and shifts to higher angles. The latter observation indicates that the L10 ordering improved and the in-plane '200' component (e.g., undesirable growth) is suppressed.

In several embodiments, the surface roughness of the media structures having an underlayer as described herein is significantly reduced as compared to FePt C media. More specifically, measurements of average roughness (Ra) and peak roughness (Rp) for the media having the underlayer can be substantially reduced. In one embodiment, for example, the Ra improved from 11.9 angstroms (A) to 7.6 A and Rp improved from 64 A to 33 A.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for fabricating a magnetic media with improved performance characteristics, the method comprising:
   providing a non-magnetic substrate;
   forming a seed layer above the substrate, the seed layer comprising MgO;
   forming an underlayer directly on the seed layer, the underlayer comprising a material selected from the group consisting of Pd, Pt, W, Fe, and V; and
   forming a magnetic recording layer on the underlayer, the recording layer comprising FePt oxide,
   wherein the underlayer comprises a thickness of less than 1 nm.

2. The method of claim 1, further comprising:
   forming an amorphous underlayer on the non-magnetic substrate;
   forming a heat-sink layer on the amorphous underlayer; and
   forming an amorphous interlayer on the heat-sink layer, wherein the seed layer is positioned on the amorphous interlayer.

3. A method for fabricating a magnetic media with improved performance characteristics, the method comprising:
   providing a non-magnetic substrate;
   forming a seed layer above the substrate, the seed layer comprising MgO;
   forming an underlayer on the seed layer, the underlayer comprising a material selected from the group consisting of Pd, Pt, W, Fe, V, Cu, and Ag;
   forming a magnetic recording layer on the underlayer, the recording layer comprising FePt oxide;
   forming an amorphous underlayer on the non-magnetic substrate;
   forming a heat-sink layer on the amorphous underlayer; and
   forming an amorphous interlayer on the heat-sink layer,
   wherein the seed layer is positioned on the amorphous interlayer, and
   wherein the amorphous underlayer comprises CoTaZr and a material selected from the group consisting of CrTa, CoCrFeZrB, and CoCrTaZr.

4. The method of claim 2, wherein the heat-sink layer comprises a material selected from the group consisting of Cu, CuZr, W, Ru, and CuTi.

5. The method of claim 2, wherein the amorphous interlayer comprises a material selected from the group consisting of amorphous magnetic CoTaZr, non-magnetic CoCrTaZr, and non-magnetic CoCrFeZrB.

6. The method of claim 2, wherein the seed layer, the underlayer, the recording layer, the amorphous underlayer, the heat-sink layer, and the amorphous interlayer are formed using a plurality of sputter deposition processes.

7. A method for fabricating a magnetic media with improved performance characteristics, the method comprising:
   providing a non-magnetic substrate;
   forming a seed layer above the substrate, the seed layer comprising MgO;
   forming an underlayer on the seed layer, the underlayer comprising a material selected from the group consisting of Pd, Pt, W, Fe, V, Cu, and Ag;
   forming a magnetic recording layer on the underlayer, the recording layer comprising FePt oxide;
   forming an amorphous underlayer on the non-magnetic substrate;
   forming a heat-sink layer on the amorphous underlayer; and
   forming an amorphous interlayer on the heat-sink layer,
   wherein the seed layer is positioned on the amorphous interlayer,
   wherein the amorphous underlayer comprises a thickness of about 10 nanometers (nm) to about 50 nm,
   wherein the heat-sink layer comprises a thickness of about 10 nm to about 100 nm,
   wherein the amorphous interlayer comprises a thickness of about 10 nm to about 50 nm,
   wherein the seed layer comprises a thickness of about 1 nm to about 10 nm,
   wherein the underlayer comprises a thickness of less than 1 nm, and
   wherein the recording layer comprises a thickness of about 5 nm to about 15 nm.

8. The method of 2:
   wherein the amorphous underlayer comprises a thickness of about 40 nanometers (nm),
   wherein the heat-sink layer comprises a thickness of about 40 nm,
   wherein the amorphous interlayer comprises a thickness of about 20 nm,
   wherein the seed layer comprises a thickness of about 4 nm, and
   wherein the recording layer comprises a thickness of about 10 nm.

9. The method of claim 1, wherein the underlayer consists essentially of Pd.

10. The method of claim 1, wherein the underlayer consists of Pd.

11. The method of claim 1, wherein the seed layer, the underlayer and the recording layer are formed using a plurality of sputter deposition processes.

12. A magnetic media structure with improved performance characteristics, the media structure comprising:
    a non-magnetic substrate;
    an amorphous interlayer positioned on the non-magnetic substrate;
    a seed layer positioned on the amorphous interlayer, the seed layer comprising MgO;
    an underlayer positioned directly on the seed layer, the underlayer comprising a material selected from the group consisting of Pd, Pt, W, Fe, and V; and
    a magnetic recording layer positioned on the underlayer, the recording layer comprising FePt oxide,
    wherein the underlayer comprises a thickness of less than 1 nm.

13. The media structure of claim 12, further comprising:
    an amorphous underlayer positioned on the non-magnetic substrate; and
    a heat-sink layer positioned on the amorphous underlayer,
    wherein the amorphous interlayer is positioned on the heat-sink layer.

14. A magnetic media structure with improved performance characteristics, the media structure comprising:
    a non-magnetic substrate;
    an amorphous interlayer positioned on the non-magnetic substrate;
    a seed layer positioned on the amorphous interlayer, the seed layer comprising MgO;
    an underlayer positioned on the seed layer, the underlayer comprising a material selected from the group consisting of Pd, Pt, W, Fe, V, Cu, and Ag;
    a magnetic recording layer positioned on the underlayer, the recording layer comprising FePt oxide;
    an amorphous underlayer positioned on the non-magnetic substrate; and
    a heat-sink layer positioned on the amorphous underlayer,
    wherein the amorphous interlayer is positioned on the heat-sink layer, and
    wherein the amorphous underlayer comprises CoTaZr and a material selected from the group consisting of CrTa, CoCrFeZrB, and CoCrTaZr.

15. The media structure of claim 13, wherein the heat-sink layer comprises a material selected from the group consisting of Cu, CuZr, W, Ru, and CuTi.

16. The media structure of claim 13, wherein the seed layer, the underlayer, the recording layer, the amorphous underlayer, the heat-sink layer, and the amorphous interlayer are formed using a plurality of sputter deposition processes.

17. A magnetic media structure with improved performance characteristics, the media structure comprising:
    a non-magnetic substrate;
    an amorphous interlayer positioned on the non-magnetic substrate;
    a seed layer positioned on the amorphous interlayer, the seed layer comprising MgO;

an underlayer positioned on the seed layer, the underlayer comprising a material selected from the group consisting of Pd, Pt, W, Fe, V, Cu, and Ag;

a magnetic recording layer positioned on the underlayer, the recording layer comprising FePt oxide;

an amorphous underlayer positioned on the non-magnetic substrate; and a heat-sink layer positioned on the amorphous underlayer, wherein the amorphous interlayer is positioned on the heat-sink layer, wherein the amorphous underlayer comprises a thickness of about 10 nanometers (nm) to about 50 nm, wherein the heat-sink layer comprises a thickness of about 10 nm to about 100 nm, wherein the amorphous interlayer comprises a thickness of about 10 nm to about 50 nm, wherein the seed layer comprises a thickness of about 1 nm to about 10 nm, wherein the underlayer comprises a thickness of less than 1 nm, and wherein the recording layer comprises a thickness of about 5 nm to about 15 nm.

18. The media structure of claim 13:

wherein the amorphous underlayer comprises a thickness of about 40 nanometers (nm), wherein the heat-sink layer comprises a thickness of about 40 nm, wherein the amorphous interlayer comprises a thickness of about 20 nm, wherein the seed layer comprises a thickness of about 4 nm, and wherein the recording layer comprises a thickness of about 10 nm.

19. The media structure of claim 12, wherein the amorphous interlayer comprises a material selected from the group consisting of amorphous magnetic CoTaZr, non-magnetic CoCrTaZr, and non-magnetic CoCrFeZrB.

20. The media structure of claim 12, wherein the underlayer consists essentially of Pd.

21. The media structure of claim 12, wherein the underlayer consists of Pd.

22. The media structure of claim 12, wherein the magnetic recording layer is positioned directly on the underlayer.

23. The method of claim 1, wherein the forming the magnetic recording layer on the underlayer comprises forming the magnetic recording layer directly on the underlayer.

24. The method of claim 1, wherein the material of the underlayer is selected from the group consisting of Pd, W, Fe, and V.

25. The method of claim 1, wherein the material of the underlayer comprises Pd.

26. The method of claim 1, wherein the material of the underlayer comprises W.

27. The method of claim 1, wherein the material of the underlayer comprises Fe.

28. The method of claim 1, wherein the material of the underlayer comprises V.

29. The media structure of claim 12, wherein the material of the underlayer is selected from the group consisting of Pd, W, Fe, and V.

30. The media structure of claim 12, wherein the material of the underlayer comprises Pd.

31. The media structure of claim 12, wherein the material of the underlayer comprises W.

32. The media structure of claim 12, wherein the material of the underlayer comprises Fe.

33. The media structure of claim 12, wherein the material of the underlayer comprises V.

34. A method for fabricating a magnetic media with improved performance characteristics, the method comprising:

providing a non-magnetic substrate;

forming a seed layer above the substrate, the seed layer comprising MgO;

forming an underlayer directly on the seed layer, the underlayer comprising a material selected from the group consisting of Pd, Pt, W, Fe, and V; and forming a magnetic recording layer on the underlayer, the recording layer comprising FePt oxide, wherein the underlayer comprises a thickness of substantially less than 1 nm.

35. A magnetic media structure with improved performance characteristics, the media structure comprising:

a non-magnetic substrate;

an amorphous interlayer positioned on the non-magnetic substrate;

a seed layer positioned on the amorphous interlayer, the seed layer comprising MgO;

an underlayer positioned directly on the seed layer, the underlayer comprising a material selected from the group consisting of Pd, Pt, W, Fe, and V; and a magnetic recording layer positioned on the underlayer, the recording layer comprising FePt oxide, wherein the underlayer comprises a thickness of substantially less than 1 nm.

* * * * *